(12) United States Patent
Lin et al.

(10) Patent No.: US 7,106,603 B1
(45) Date of Patent: Sep. 12, 2006

(54) SWITCH-MODE SELF-COUPLING AUXILIARY POWER DEVICE

(75) Inventors: Feng-Hsu Lin, I Lan Hsien (TW); Wen-Yu Lu, Tao Yuan Hsien (TW)

(73) Assignee: Li Shin International Enterprise Corporation, Taoyuan Hsien (TW)

( * ) Notice: Subject to any disclaimer, the term of this patent is extended or adjusted under 35 U.S.C. 154(b) by 0 days.

(21) Appl. No.: 11/134,404

(22) Filed: May 23, 2005

(51) Int. Cl.
*H02M 3/335* (2006.01)

(52) U.S. Cl. .............................. 363/21.08; 363/21.16; 363/97

(58) Field of Classification Search ............. 363/21.04, 363/21.08, 21.12, 21.16, 97, 131; 323/288
See application file for complete search history.

(56) References Cited

U.S. PATENT DOCUMENTS

| | | | | |
|---|---|---|---|---|
| 5,661,642 A * | 8/1997 | Shimashita | ............... | 363/21.15 |
| 6,088,244 A * | 7/2000 | Shioya et al. | ............ | 363/21.07 |
| 6,370,045 B1 * | 4/2002 | Lurkens | .................... | 363/21.12 |
| 6,434,030 B1 * | 8/2002 | Rehm et al. | .................. | 363/97 |
| 6,972,969 B1 * | 12/2005 | Shteynberg et al. | ..... | 363/21.12 |
| 6,975,521 B1 * | 12/2005 | Konno | .................... | 363/21.08 |

\* cited by examiner

*Primary Examiner*—Gary L Laxton
(74) *Attorney, Agent, or Firm*—Rosenberg, Klein & Lee

(57) ABSTRACT

A switch-mode self-coupling power device additionally increases a set of high voltage auxiliary winding in the transformer and increases a control circuit and an energy transmitting circuit in the primary side circuit of the conventional circuit. When the load is too low, the control circuit may control the energy transmitting circuit according to the variation of the load so that the voltage of the high voltage auxiliary winding can be transmitted to a controller for operation through the energy transmitting circuit. Therefore, the design of PWM controller (pulse width modulation controller) auxiliary power circuit according to the present invention, which is not limited by the magnitude of a dummy load at the secondary side of the transformer, can conform to international regulations and is a product with industrial purpose and conforming to green mode.

5 Claims, 9 Drawing Sheets

SWITCH-MODE SELF-COUPLING AUXILIARY POWER DEVICE

BACKGROUND OF THE INVENTION

1. Field of the Invention

The present invention is related to a switch-mode self-coupling auxiliary power device, which is an assistant power device providing an enough voltage power to a controller under a low load.

2. Description of Related Art

According to the tendency of information appliances, in addition to powerful functions and low price, power saving is an important subject. For conforming to the requirement for power saving, many standards have are established; for example, GEEA of Europe stipulates that a power converter for a LCD TV should have a standby power of less than 1 W, and ENERGY STAR of U.S.A. also stipulates that a power converter with an output power ranging between 10 to 250 W should have a no-load power less than 0.75 W. Therefore, when improving the material used by the manufacturer for achieving a power-saving effect, the power converter is also an important key point in power saving. However, when the conventional power supplier containing a PFC (Power Factor Correction) is used with information appliances, conformation to the power saving standards does not always occur, so as to cause a lot of bother.

References are made to FIGS. 1A, 1B and 1C which are schematic views showing the circuits of the conventional power converter. The power converter circuit utilizes an isolation function of a transformer T to divide the transformer T into a primary side circuit 10 and a secondary side circuit 20. A controller 108 in the primary side circuit 10 can control the switch action of a power switch Q10 such that the input electricity may discontinuously pass through the transformer T for providing the secondary side circuit the load.

The controller 108 is used to control the switch action of the power converter. However, the controller 108 needs a supplying voltage to support a normal action of an internal control circuit thereof. As shown in FIG. 1, once the input voltage VIN is applied to the power converter, a voltage will be induced on an auxiliary winding Na of the transformer T, and the induced voltage on the auxiliary winding Na will charge a maintaining capacitor C28 for provision to the controller 108.

In the market, for conforming to the request of power saving, the controller 108 of the power converter mostly uses a variable frequency to achieve the green mode. In other words, when the load of the secondary side circuit is under different conditions, the power converter may be automatically adjusted to have a best frequency according to the variation of the load for achieving a best power saving efficiency. Therefore, when outputting a full load, the power converter may need a high efficiency, and when outputting no load, it may want to lower the loss. However, according to the present technology, when the output load of power converter is very low, the controller 108 always controls the switch behavior of the power switch Q10 in a burst mode such that the power converter can automatically reduce a switching frequency of the power switch Q10 and therefore reduce the loss at low load condition. The switching frequency in no-load is determined by the designer; in some examples, it may even be less than 500 Hz for conforming to the manufacturers' demands.

For current technology, the reason why power saving has a threshold is that the auxiliary winding Na of the transformer T provides the working voltage to the controller 108. Therefore, if some unnecessary dummy loads in the secondary circuit of the transformer T are reduced, for example, reducing the illumination of LED power indicator and adjusting an IC peripheral resistor parameter used in the secondary side circuit of the transformer T, then it may only need the necessary current for maintaining a normal function of IC so as to reduce unnecessary losses. However, this method may induce a voltage lower than the normal working voltage of the controller 108 on the auxiliary winding Na of the transformer T so as to cause a vibration of the output voltage. The reason is since all the energy is transmitted by one identical iron core of the transformer T, when the secondary side current of the transformer T becomes smaller, the induced current of the auxiliary winding Na may also induce a smaller current so as to cause the current charging the maintaining capacitor C28 to become smaller (namely, $V_{c28}$ is reduced). Therefore, using the conventional power supplying circuit to supply the controller 108 for power saving will necessarily suffer some congenital limits.

SUMMARY OF THE INVENTION

In view of above, the switch-mode self-coupling power device according to the present invention additionally increases a set of high voltage auxiliary winding in the transformer and increases a control circuit and an energy transmitting circuit in the primary side circuit of the conventional circuit. Thus, when the load is too low, the control circuit controls the energy transmitting circuit according to the variation of the load, so the voltage of the high voltage auxiliary winding can be transmitted to a controller for operation through the energy transmitting circuit.

The present invention is used in a power supplier for charging a maintaining capacitor, which provides power to a controller. The present invention uses a transformer composed of a main winding, a sub-winding, an auxiliary winding, and a high voltage auxiliary winding, which are wound on a single iron core. The main winding and the sub-winding of the transformer can divide the power supplier into a primary side circuit and a secondary side circuit, and the auxiliary winding is connected to the maintaining capacitor. The present invention uses a control circuit for obtaining a load signal and outputting a control signal according to the load signal. The present invention also uses an energy transmitting circuit, which is connected to the control circuit, the maintaining capacitor, and the high voltage auxiliary winding, and is controlled by the control signal to switch a voltage on the high voltage auxiliary winding for charging the maintaining capacitor.

As described above, when the load signal represents a high or normal load condition, a voltage on the auxiliary winding charges the maintaining capacitor and high voltage auxiliary winding does not working, contrary when the load signal represents a low load condition, the voltage only on the high voltage auxiliary winding charges the maintaining capacitor. Therefore, the present invention can solve the problem and defect of output voltage vibration caused by the auxiliary winding of the transformer sensing a voltage lower than a normal working voltage of the controller when the power supplier is under a low load condition.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF PREFERRED EMBODIMENTS

Figure 1A:
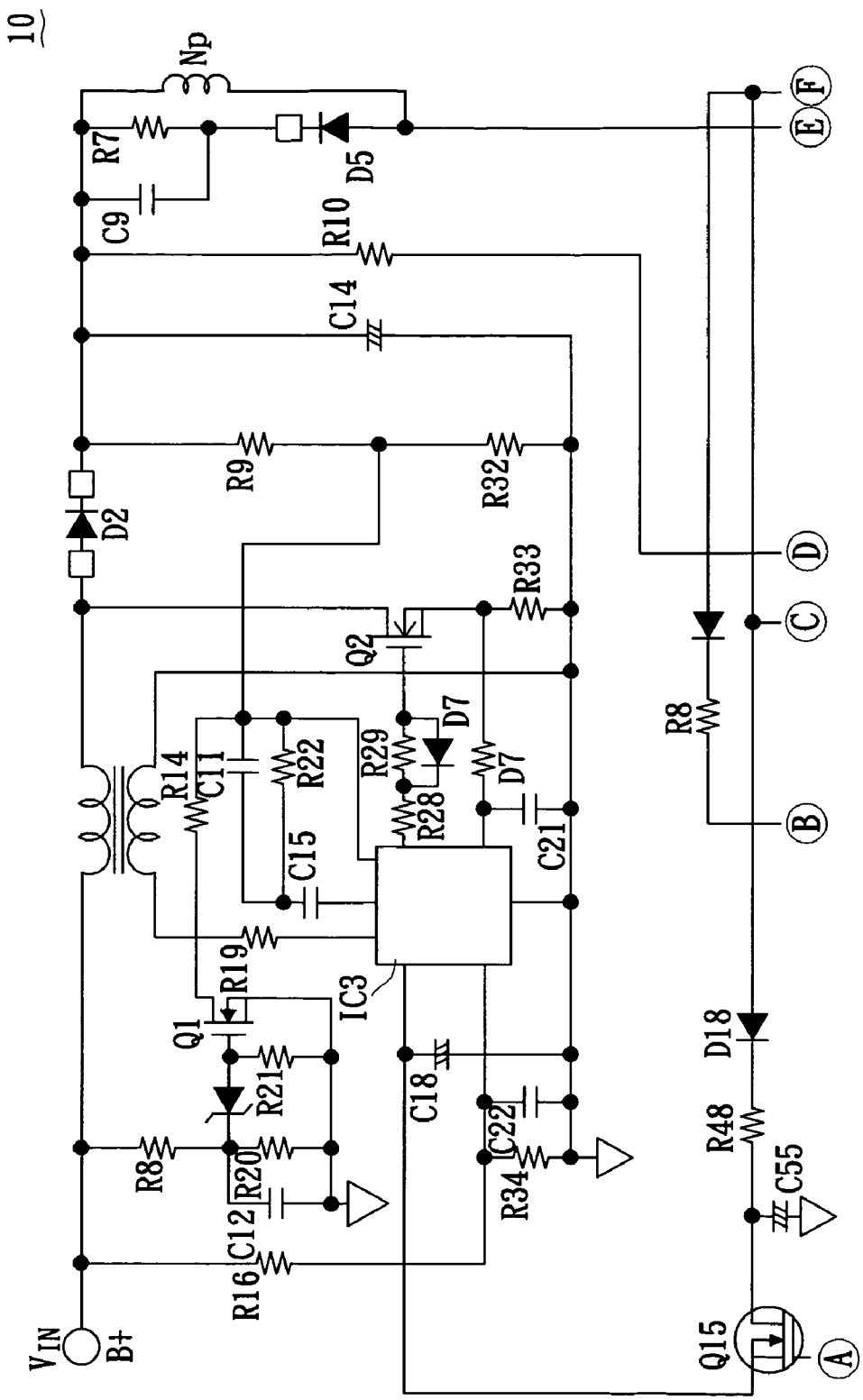
FIGS. 1A to 1C are circuit diagrams of a conventional power converter.
Figure 1B:
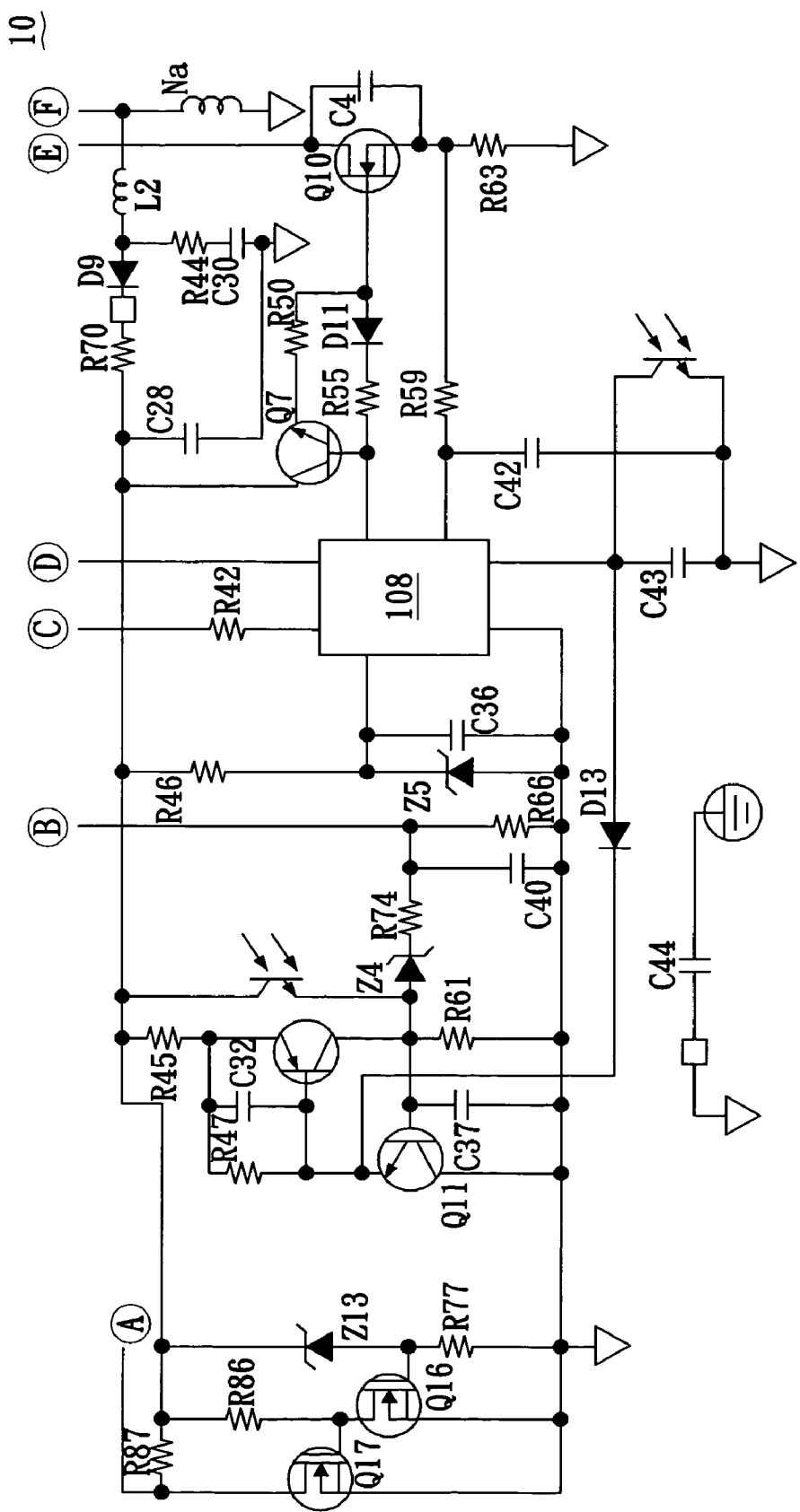
Figure 1C:
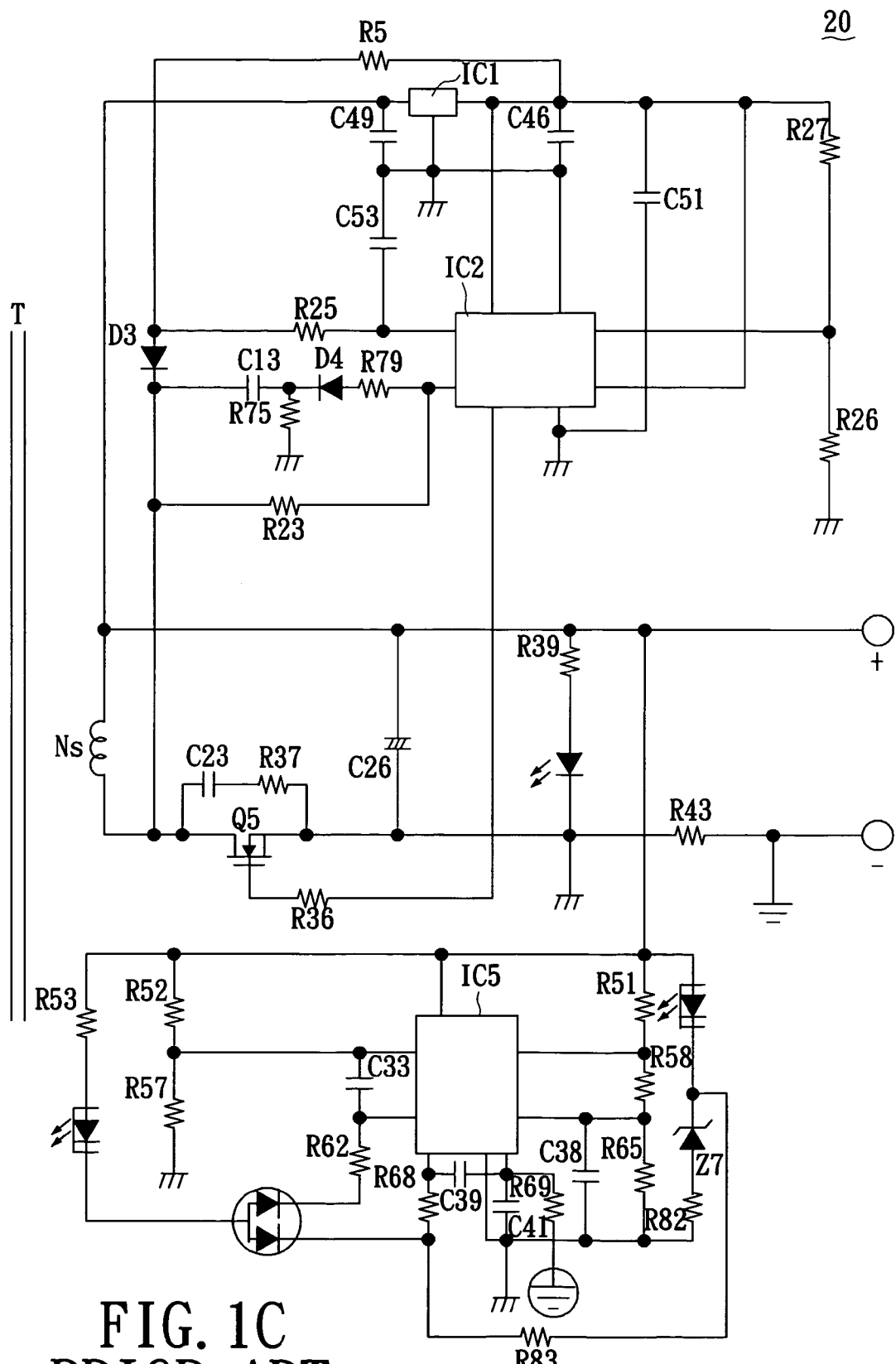
Figure 2A:
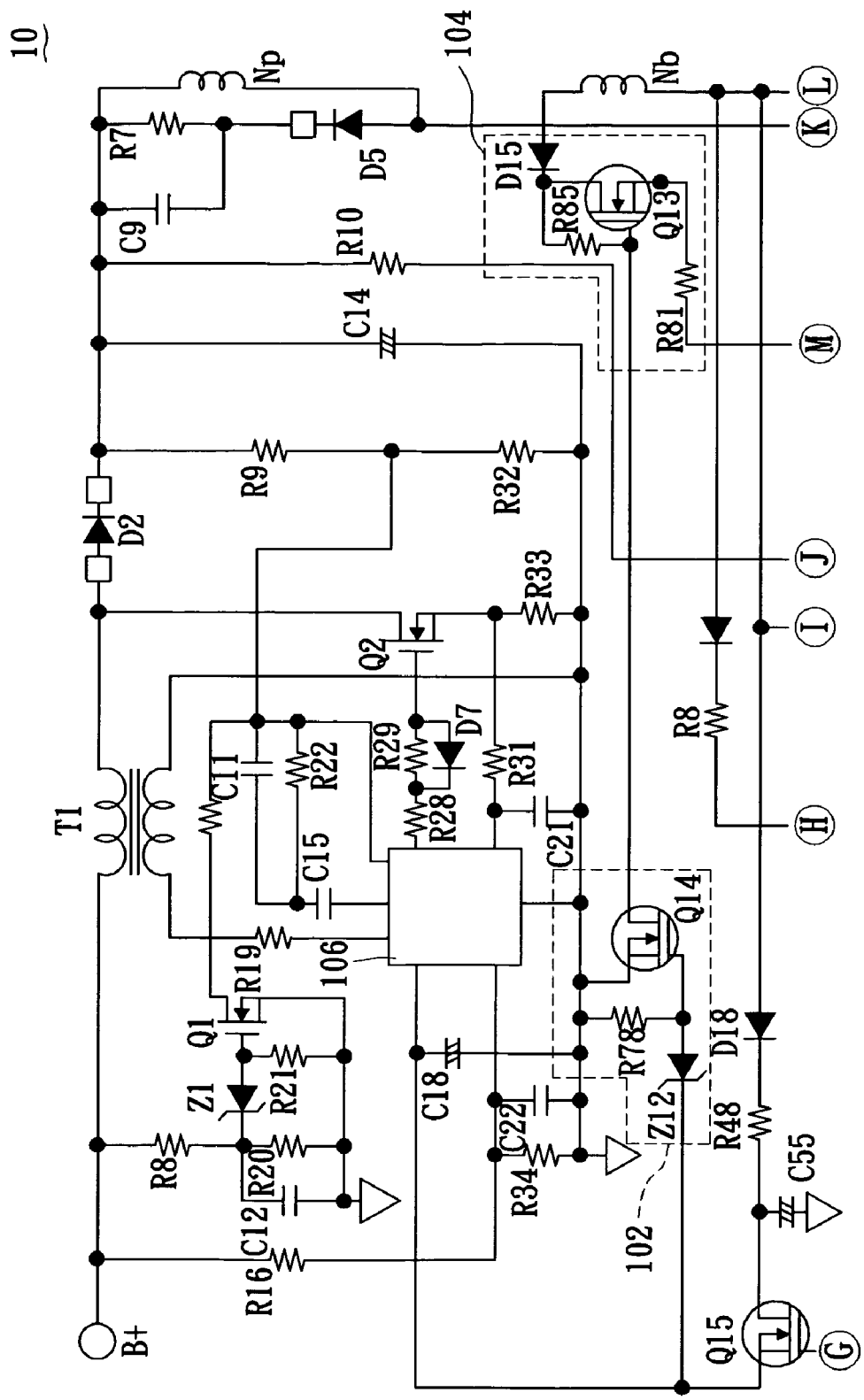
FIGS. 2A to 2C are circuit diagrams of a first embodiment according to the present invention.
Figure 2B:
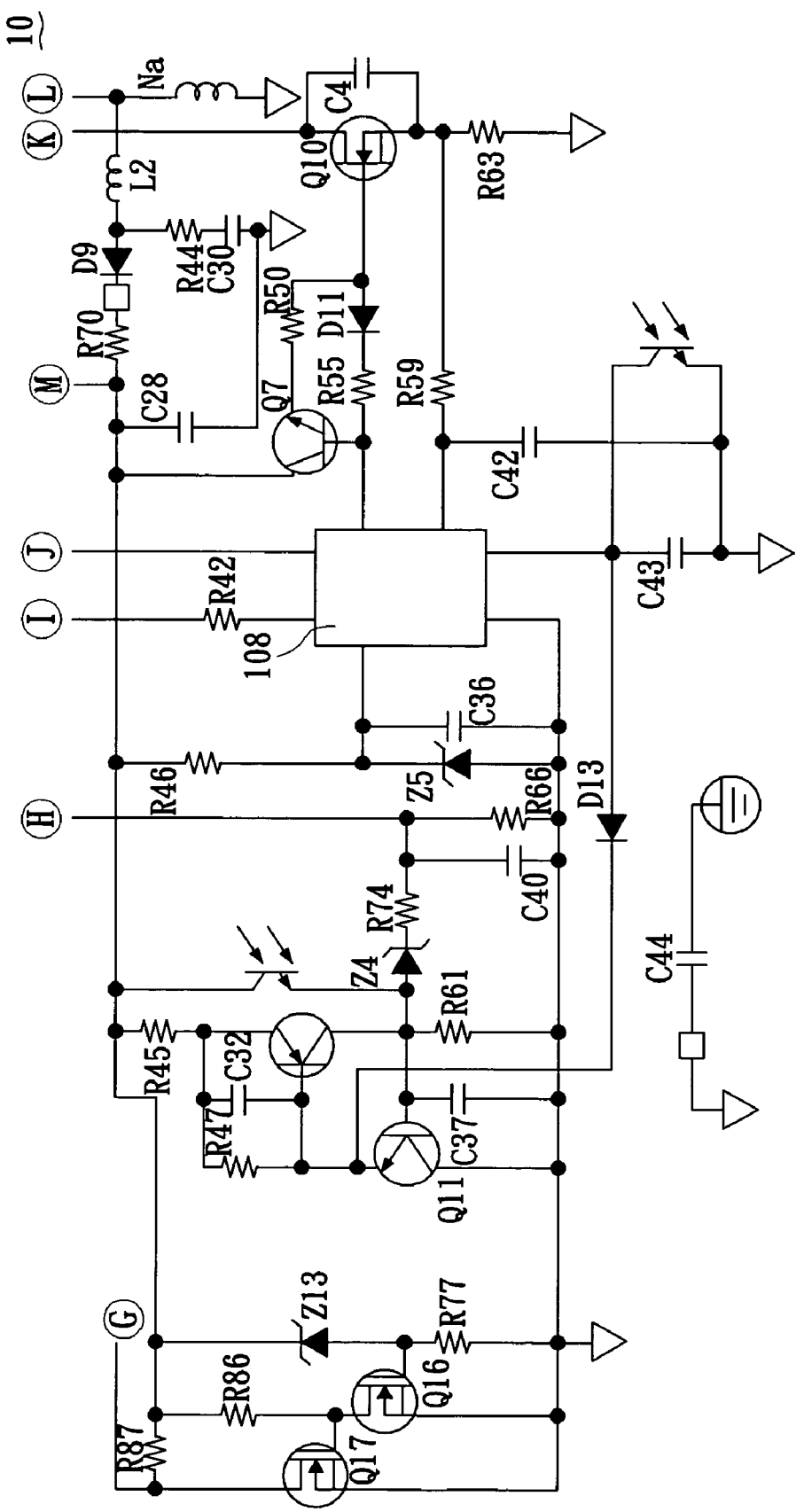
Figure 2C:
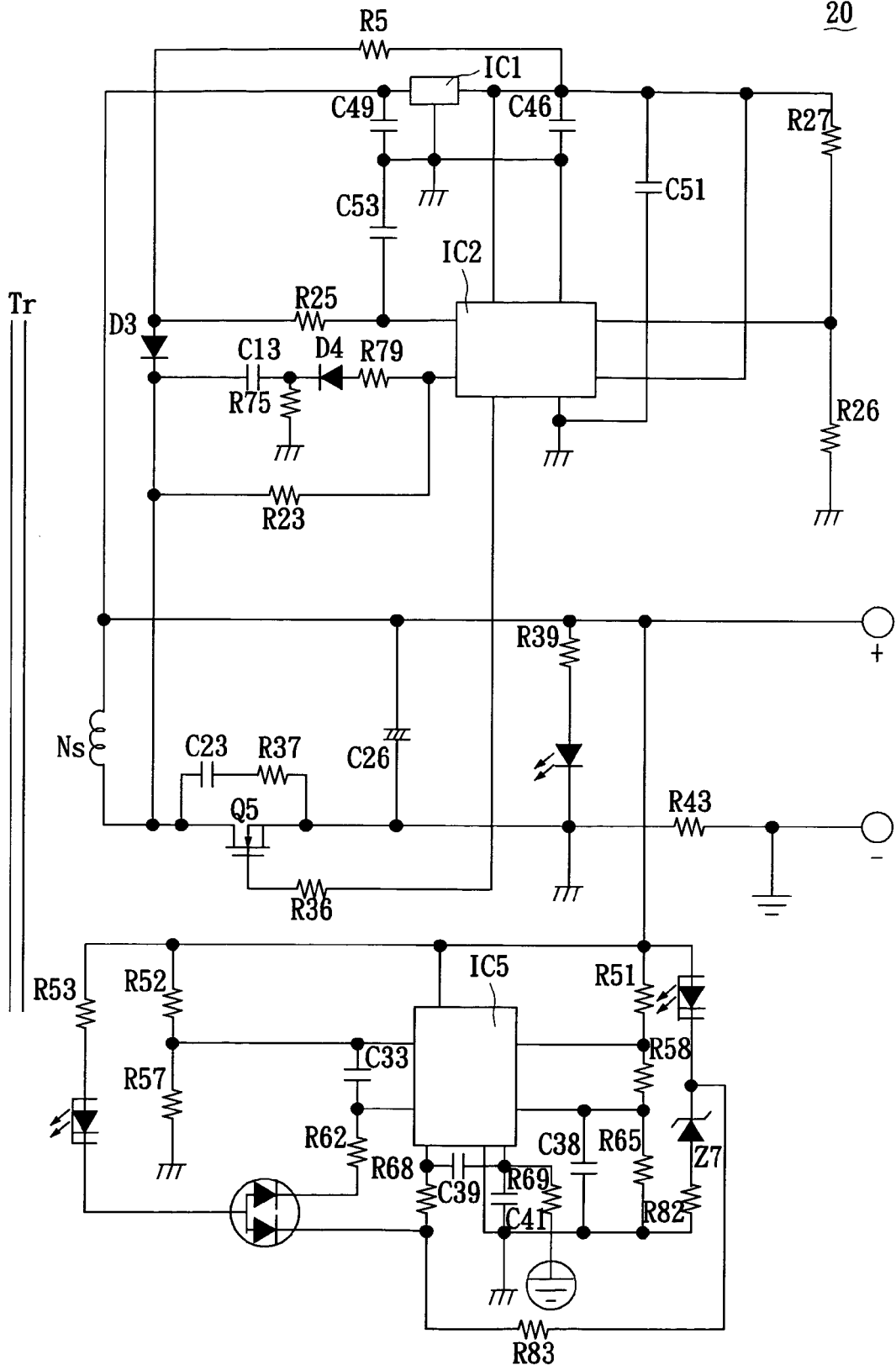

References are made to FIGS. 2A to 2C showing the circuit diagrams of a first embodiment in the present invention. A switch-mode self-coupling auxiliary power device is used in a power supplier for charging a maintaining capacitor C28 so as to provide the operation power needed by a controller 108 and includes the following elements. A transformer Tr has a main winding Np and a sub-winding Ns, which divide the power supplier into a primary side circuit 10 and a secondary side circuit 20. The transformer Tr also has an auxiliary winding Na connected to the maintaining capacitor C28, and a high voltage auxiliary winding Nb. A control circuit 102 is connected to a PFC (Power Factor Correction) 106 through a detection capacitor C18 to sensing PFC ON or OFF state. The PFC 106 ON or OFF state is used to output a load signal to the control circuit 102 according to the load of the circuit, and outputs a control signal according to the load signal. An energy transmitting circuit 104 is connected to the control circuit 102, the maintaining capacitor C28, and the high voltage auxiliary winding Nb. The energy transmitting circuit 104 is controlled by the control signal to switch the voltage on the high voltage auxiliary winding Nb for charging the maintaining capacitor C28. The energy transmitting circuit 104 has a diode D15, a second switch element Q13, and at least a resistor R85, R81.

In the above description, when the load signal output by the PFC 106 state represents a high or normal load condition, the voltage only on the auxiliary winding Na charges the maintaining capacitor C28, and when the load signal represents a low load condition, the voltage only on the high voltage auxiliary winding Nb charges the maintaining capacitor C28.

Referring to FIGS. 2A to 2C, when the voltage on the auxiliary winding Na is abnormal (namely, the output load is low), the voltage on the maintaining capacitor C28 is insufficient to supply a normal working voltage to the controller 108. At the same time, the Zener Diode Z13 paralleled with the maintaining capacitor C28 has no action (breakdown) and the resistor R77 has no voltage drop so that the transistor Q16 is OFF and the transistor Q17 is ON. Then, because the conducted transistor Q17 may ground the voltage at the control terminal of the power factor switch Q15, the power factor switch Q15 is off. Furthermore, owing to the OFF state of the power factor switch Q15, the voltage stored on the capacitor C55 may not be transmitted to the detection capacitor C18, and therefore the PFC 106 state is OFF (namely PFC function is disabled).

According to the present invention, the control circuit 102 composed of a Zener diode Z12, a resistor R78, and a first switch element Q14 is used to detect the state of the PFC 106 (namely, used to detect the potential on the capacitor C18). When the control circuit 102 detects that the potential on the capacitor C18 is low, the control circuit 102 will output a control signal to the energy transmitting circuit 104 and make the energy on the newly added high voltage auxiliary winding Nb be transmitted to the maintaining capacitor C28, such that the maintaining capacitor C28 can have a sufficient voltage for supplying the controller 108. With regard to the newly added high voltage winding Nb in the present invention, it can sense a higher voltage than the auxiliary winding Na (namely, it has a larger number of winding coils than the auxiliary winding Na) for maintaining a sufficient voltage needed by the controller 108.

As to the control signal, it can be obtained at the primary side or the secondary side. Taking the primary side as an example, the power on (HI) or off (LO) of the PFC 106 is used as the signal, and thus, if a voltage signal is present on the detection capacitor C18, the PFC 106 is initiated. Otherwise, if there is no voltage signal on the detection capacitor C18, then the PFC 106 is turned off. According to the present design, if the power converter is operated under a lighter output load, the PFC will automatically be turned off. Therefore, if the detection capacitor C18 is LOW, namely is operated under a lighter load, the Zener diode Z12 will not breakdown for conduction and the first switch element Q14 will not conduct in the absence of the potential on its gate. A conduction among the channels D–S of the second switch element Q13 is forced so that the voltage on the newly added high voltage auxiliary winding Nb can be transmitted to the maintaining capacitor C28 (the voltage on C28 is taken over by the newly added high voltage auxiliary winding Nb) to make the maintaining capacitor C28 to own a sufficient voltage for supplying the controller 108.

Otherwise, if the detection capacitor C18 is HIGH, the Zener diode will break down and the first switch element Q14 will obtain a potential on its gate so as to force the potential at the gate of the second switch element Q13 to be become zero so that a conduction among the channels D–S of the second switch element Q13 cannot be achieved. In other words, there is no energy transmitted from the newly added high voltage auxiliary winding Nb to the maintaining capacitor C28 (the voltage on the maintaining capacitor C28 is taken over by the auxiliary winding Na).

Through this switching method, the controller 108 has a normal operation under either a light load or a full load. If the controller 108 is supplied all by the newly added high voltage auxiliary winding Nb, then the supplication will not have any problem when under a lighter output load, because the newly added high voltage auxiliary winding Nb can sense a higher voltage than the conventional auxiliary winding Na, but when the output load becomes higher, the voltage on the maintaining capacitor C28 may exceed the upper limit of working voltage so as to burn the controller 108.

Figure 3A:
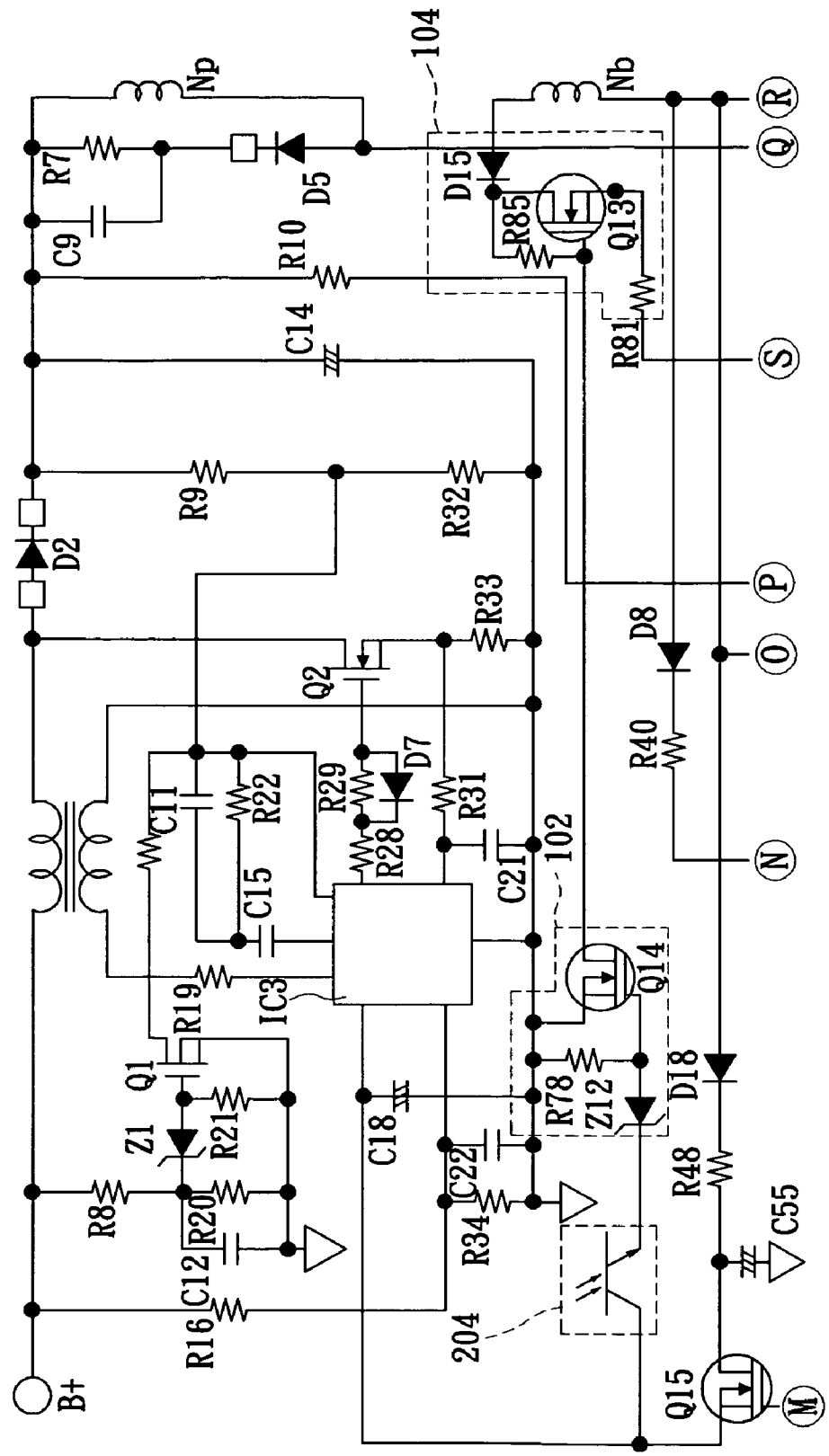
FIGS. 3A to 3C are circuit diagrams of a second embodiment according to the present invention.
Figure 3B:
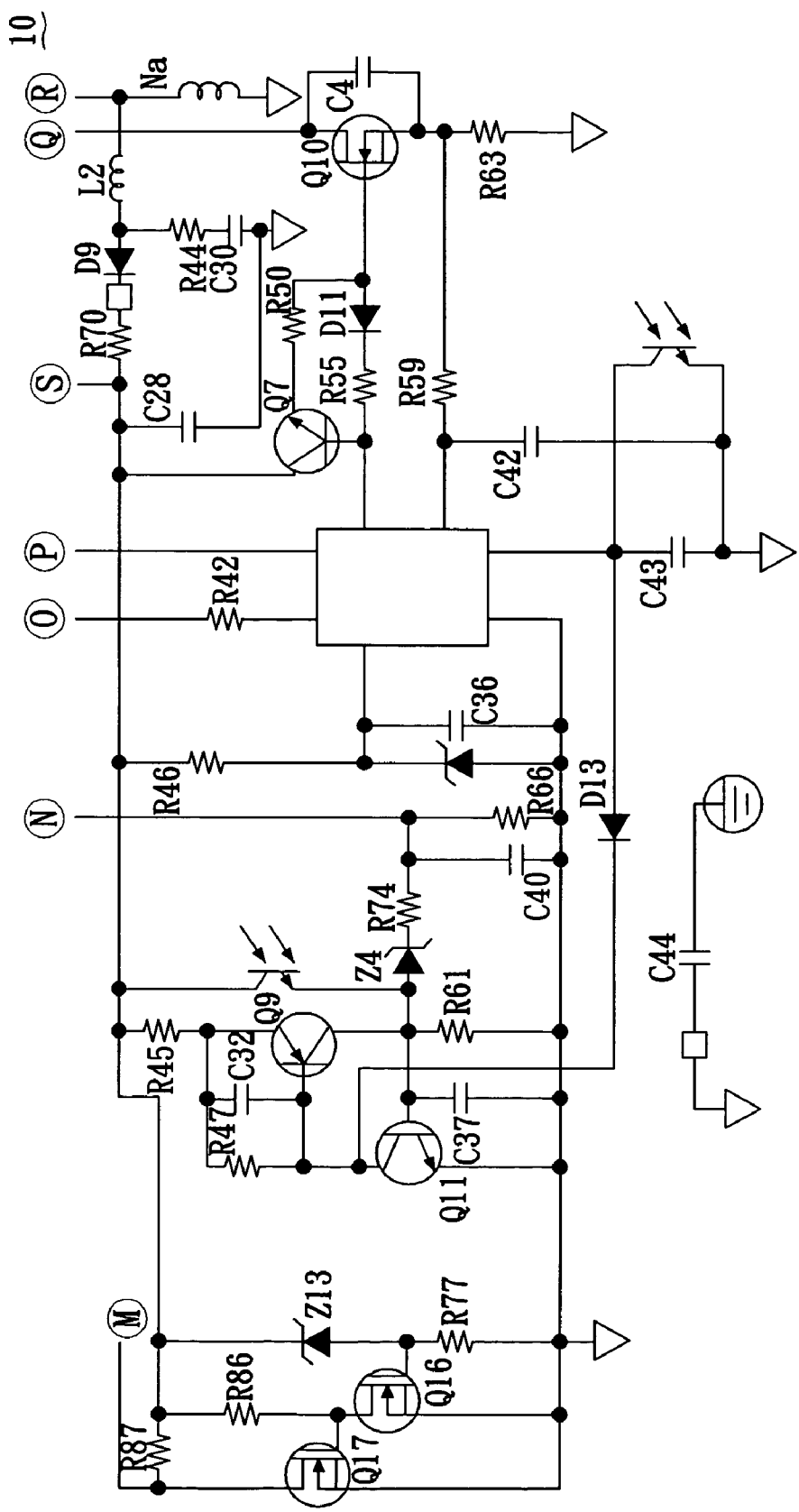
Figure 3C:
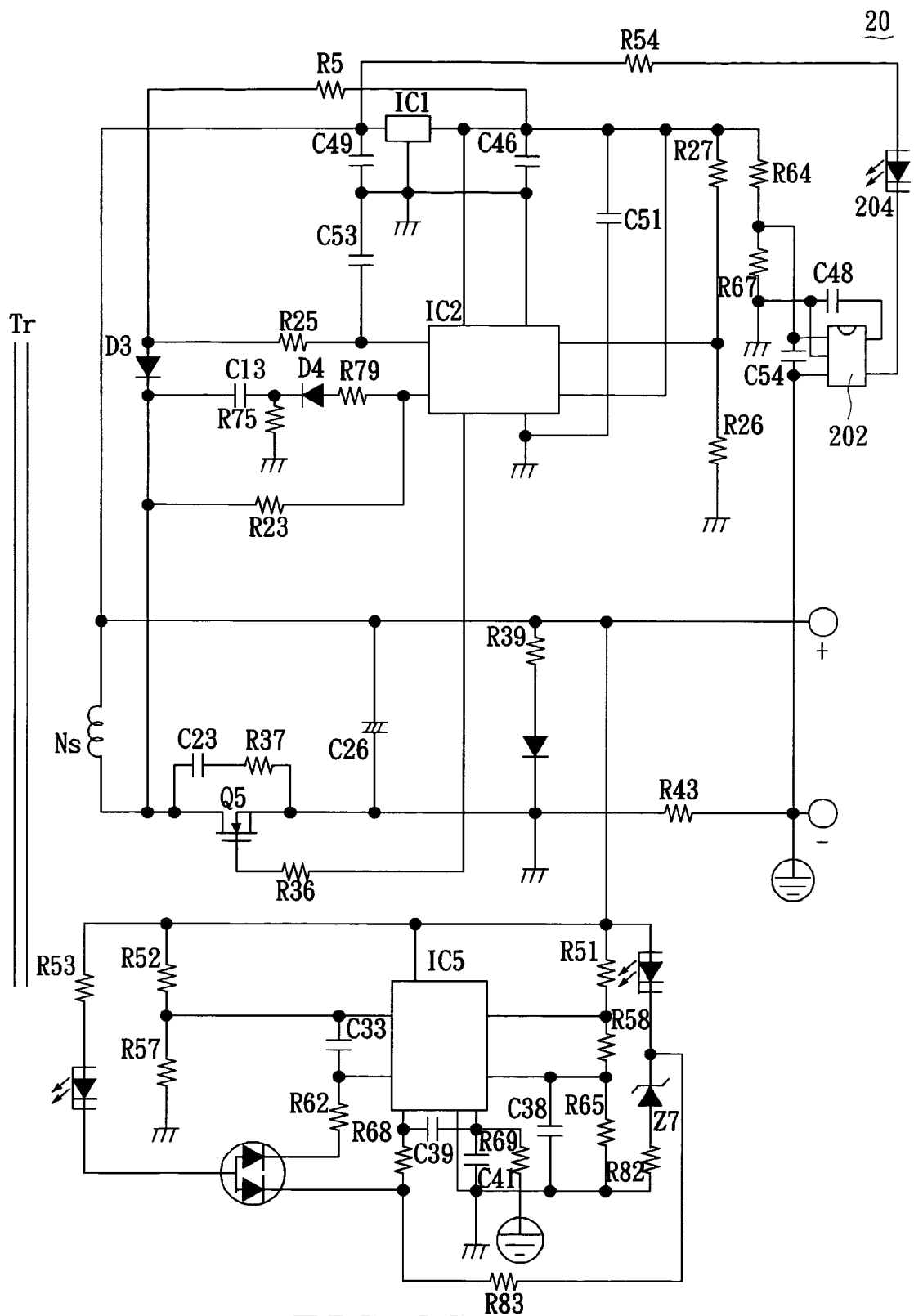

References are made to FIGS. 3A to 3C showing the circuit diagrams of a second embodiment according to the present invention. In this embodiment, a difference of the circuit from the first embodiment is the load signal is obtained from the control circuit 102. The control circuit 102 in the second embodiment is connected to a comparator 202 of the secondary side circuit 20 through an optocoupler 204. The comparator 202 may extract the load current of the secondary side circuit 20 for outputting a load signal according to the magnitude of the load current.

Once the output current is so small as to make the voltage on the maintaining capacitor C28 insufficient to supply the controller 108 for normal operation, the comparator 202 may send out a load signal to the optocoupler 204 for disabling a conduction breakdown of the Zener diode Z12 in the primary side control circuit 102 and a conduction among the channels D–S of the first switch element Q14 so as to transmit a HIGH control signal to the energy transmitting circuit 104 for enabling a conduction among the channels D–S of the second switch element Q13 and therefore obtaining a sufficient working voltage. If the load current is higher than a certain level and the voltage supplied by the conventional auxiliary winding Na is also sufficient to supply the controller 108, then the optocoupler 204 will output the load signal to the Zener diode Z12 in the primary side control circuit 102 so that the Zener diode Z12 may breakdown and conduct and the voltage on the maintaining capacitor C28 may be taken over by only the conventional auxiliary winding Na.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switch-mode self-coupling auxiliary power device in a power supplier for charging a maintaining capacitor, providing a power to a controller, comprising:

a transformer having a main winding and a sub-winding for dividing said power supplier into a primary side circuit and a secondary side circuit, an first auxiliary winding connected to said maintaining capacitor, and a high voltage second auxiliary winding;

a control circuit, wherein the control circuit obtains a load signal for outputting a control signal; and an energy transmitting circuit connected to said control circuit, said maintaining capacitor and said high voltage auxiliary second winding, controlled by said control signal to switch a voltage on said high second voltage auxiliary winding for charging said maintaining capacitor;

wherein when said load signal represents a high or normal load condition, a voltage on said first auxiliary winding charges the maintaining capacitor, and when said load signal represents a low load condition, the voltage on said high voltage second auxiliary winding charges said maintaining capacitor.

2. The device according to claim 1, wherein said control circuit is connected to a PFC (Power Factor Correction) ON or OFF state through a detection capacitor, said PFC being used to output said load signal according to a magnitude of the circuit load.

3. The device according to claim 1, wherein said control circuit is connected to a comparator of said secondary side circuit through an optocoupler, the comparator being used to extract a load current of said secondary side circuit for outputting said load signal according to a magnitude of said load current.

4. The device according to claim 1, wherein said control circuit is composed of a Zener diode, a resistor, and a first switch element.

5. The device according to claim 1, wherein said energy transmitting circuit is composed of a diode, a second switch element and at least a resistor.

* * * * *